Sept. 1, 1964 R. EDMONDSON 3,146,471
BOLT MAKING MACHINE WITH POINTER MECHANISM
Filed Feb. 8, 1961 5 Sheets-Sheet 1
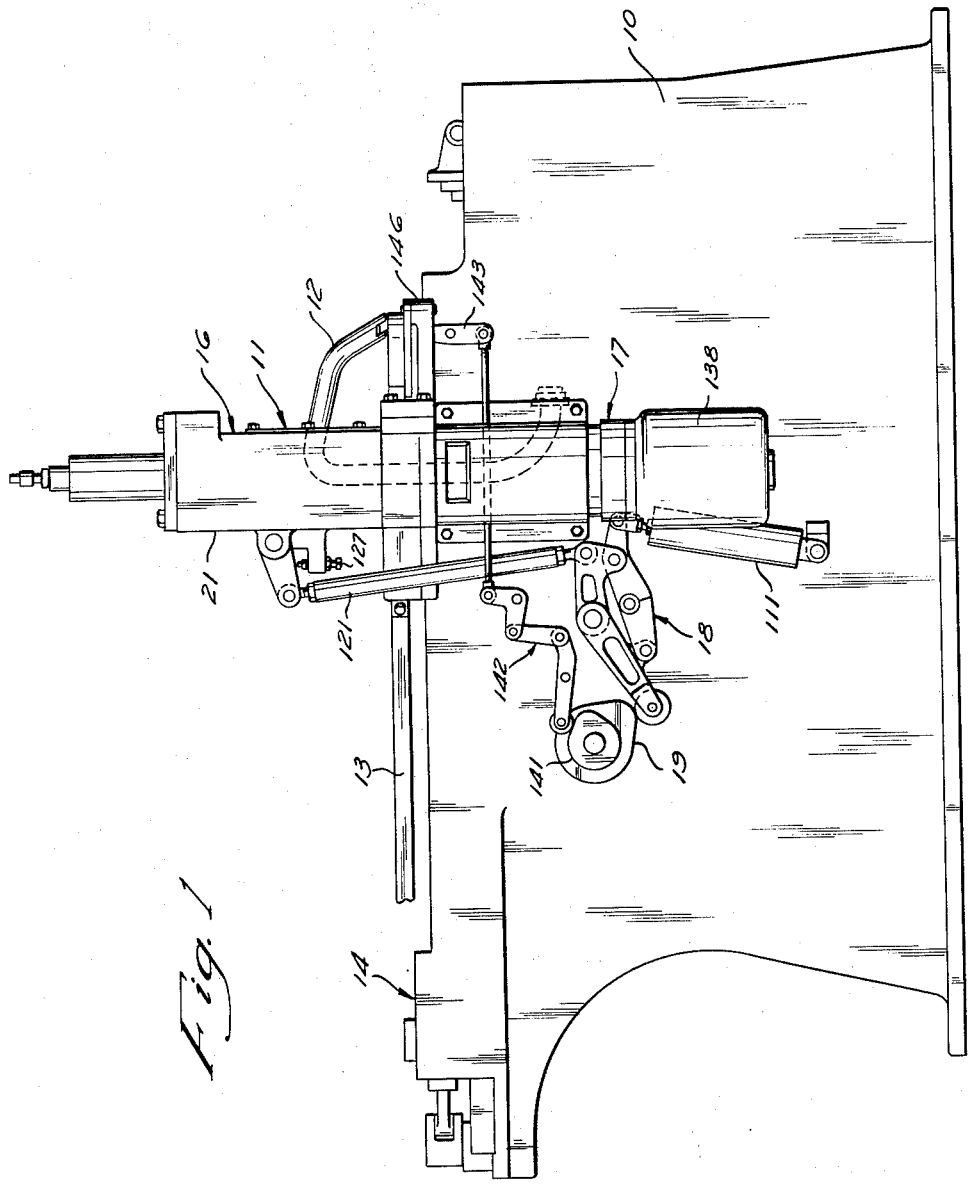
INVENTOR.
RICHARD EDMONDSON
BY
RICHEY, McNENNY, & FARRINGTON
ATTORNEYS Sept. 1, 1964  R. EDMONDSON  3,146,471
BOLT MAKING MACHINE WITH POINTER MECHANISM
Filed Feb. 8, 1961  5 Sheets-Sheet 2
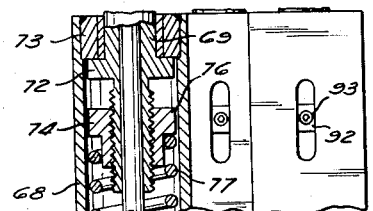
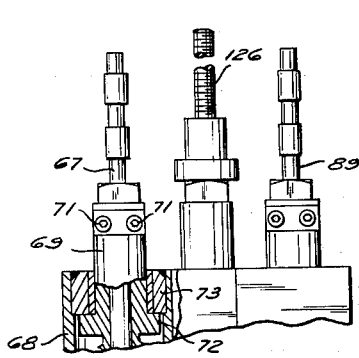
Fig. 2a
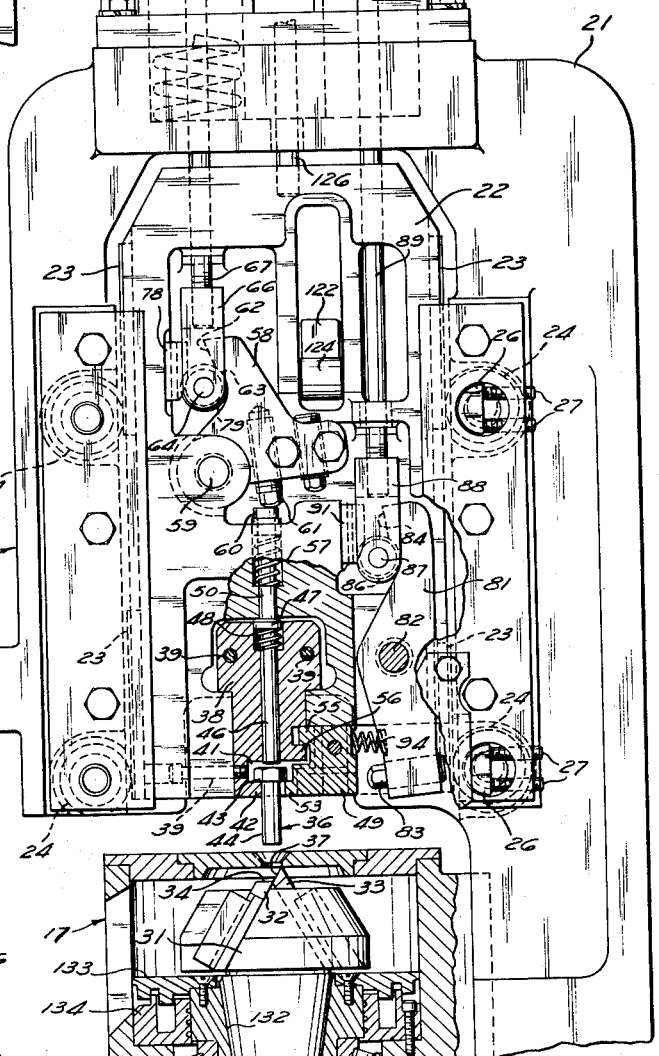
Fig. 2
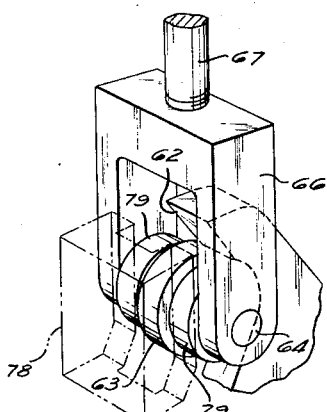
Fig. 2b
INVENTOR.
RICHARD EDMONDSON
BY
RICHEY, McNENNY, & FARRINGTON
ATTORNEYS Sept. 1, 1964 R. EDMONDSON 3,146,471
BOLT MAKING MACHINE WITH POINTER MECHANISM
Filed Feb. 8, 1961 5 Sheets-Sheet 3
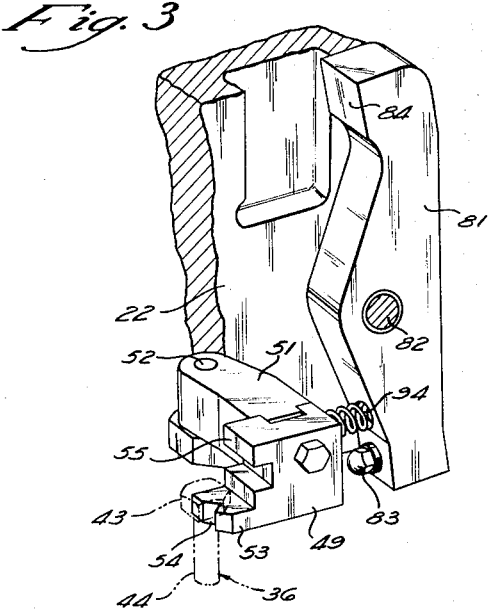
Fig. 3
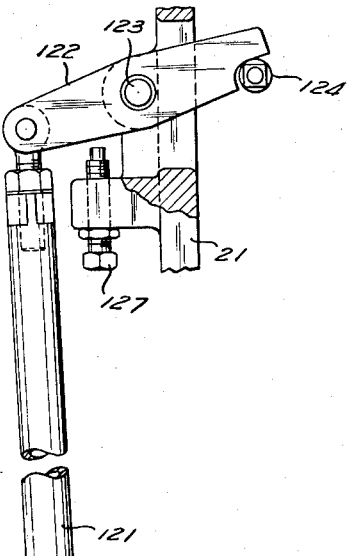
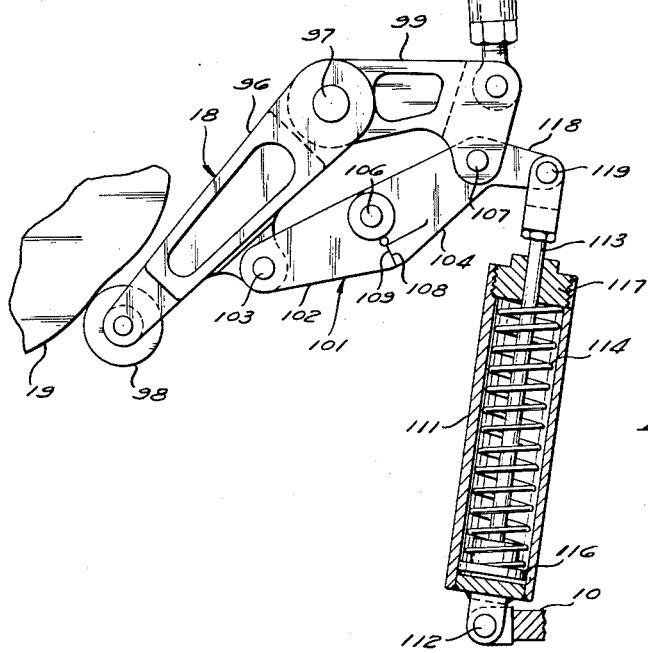
Fig. 4
INVENTOR.
RICHARD EDMONDSON
BY
RICHEY, McNENNY & FARRINGTON
ATTORNEYS Sept. 1, 1964   R. EDMONDSON   3,146,471
BOLT MAKING MACHINE WITH POINTER MECHANISM
Filed Feb. 8, 1961   5 Sheets-Sheet 4

INVENTOR.
RICHARD EDMONDSON
BY
RICHEY, MCNENNY, & FARRINGTON
ATTORNEYS

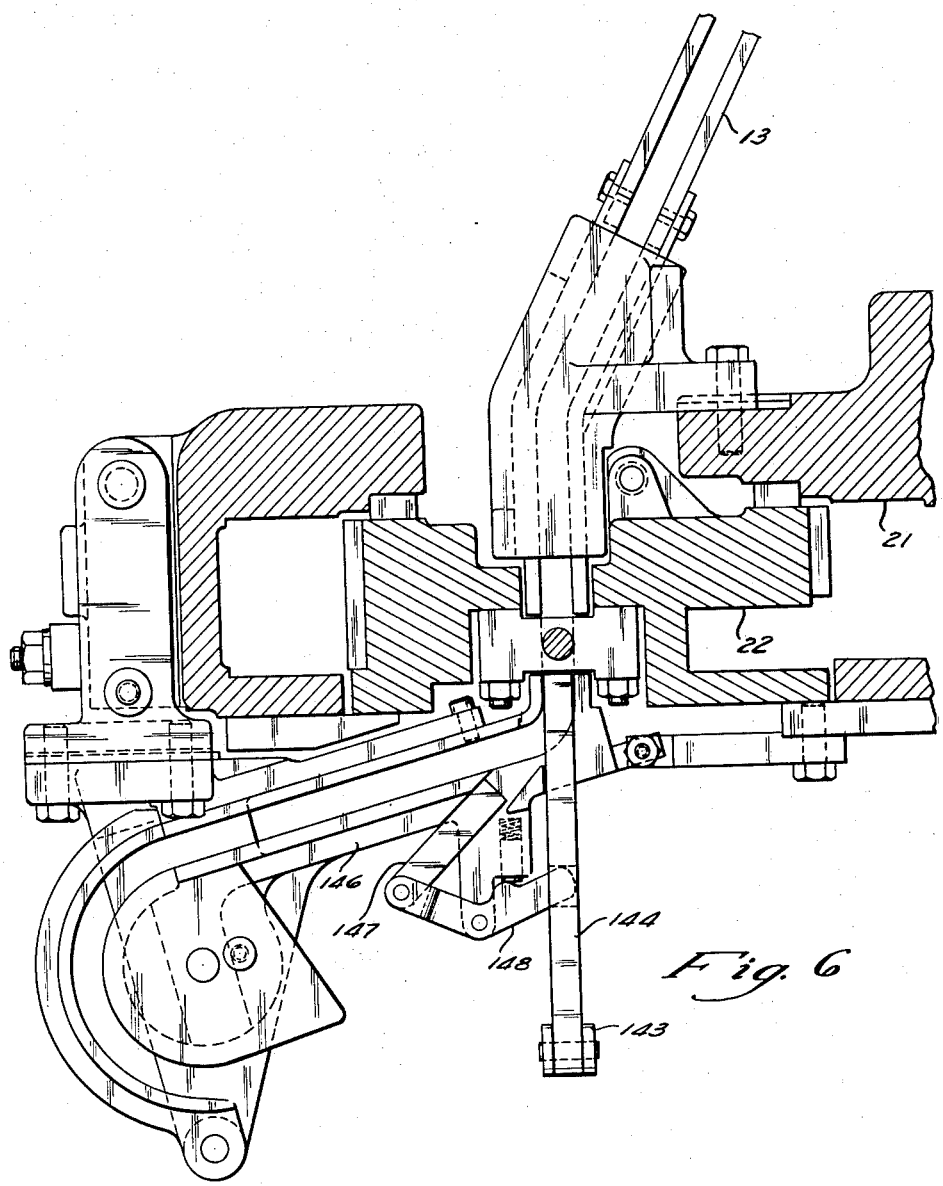

United States Patent Office 3,146,471
Patented Sept. 1, 1964

3,146,471
BOLT MAKING MACHINE WITH
POINTER MECHANISM
Richard Edmondson, Tiffin, Ohio, assignor to The National Machinery Company, Tiffin, Ohio, a corporation of Ohio
Filed Feb. 8, 1961, Ser. No. 87,937
10 Claims. (Cl. 10—11)

This invention relates generally to bolt making machinery and more particularly to a pointer mechanism suitable for use with a combined machine for making bolts of the general class described in the patent to John H. Friedman, No. 2,020,660, dated November 12, 1935.

In a machine for making bolts or screws, it is customary to cut blanks from wire stock fed into the machine and transfer such blanks to a heading operation wherein a blank having a head and a shank is formed. From the heading operation the headed blanks are transferred to a pointer which forms the necessary point shape on the bolt blank. From the pointer the pointed blank is transferred to a thread roller wherein the threads are formed to complete the bolt. Due to the increased speed of operation of header machines, particularly of the double blow header type, it is necessary to increase the rate of operation of the pointer and thread rollers so that advantage can be taken of this high rate of operation.

It is also necessary to provide a pointer which accurately forms the pointed end of the bolt blank. This is particularly important in high quality bolts which have severe specification requirements as to the length of the shank from the underside of the head and the shape of the threaded portion of the bolt. A pointer mechanism according to this invention provides the high degree of accuracy necessary for high quality bolts and is capable of operating at the high cyclic rate of the improved heading machines so that a single pointer has sufficient output to handle the entire output of the combined machines.

The pointer incorporating this invention therefore is provided with two separate means to double grip the blank so that it is accurately located in the chuck. One means grips the blank to accurately locate the underside of the head relative to the chuck and the other grips the shank to provide accurate lateral positioning. Therefore, the blank is accurately positioned in both an axial and radial direction and is tightly gripped so that high speed cutters can be used in the pointer operation without chattering or the like. The operational timing and gripping pressure of the two separate gripping means can be separately adjusted to provide a machine which can be adapted to meet the various requirements of different types of blanks.

To insure that the point is accurately formed on the blank, a positive mechanical feed is provided for the chuck. This also permits the increased speed of operation since the feed of the blank into the pointer cutters can be programmed for optimum operation.

It is an important object of this invention to provide a pointer for headed articles which grips both the head and the shank to provide positive positioning in both the axial and radial directions.

It is another important object of this invention to provide a pointer for headed articles having positive feed moving the blank to a predetermined position so that the pointed blank will have a uniform length.

It is another important object of this invention to provide a pointer for headed articles such as bolts wherein the bolt blank is gripped by two separate gripping means each independently adjustable to provide the correct pressure of gripping.

It is still another object of this invention to provide a bolt pointer including a blank gripping chuck assembly reciprocable in preloaded guide bearings to eliminate chattering and the like.

It is still another object of this invention to provide a bolt pointer having two separate blank gripping means and independent means to adjust the timing and pressure of the separate gripping means.

It is still another object of this invention to provide a bolt pointer having a positive mechanical feed for the pointing operation which automatically relieves or releases in the event of machine jamming or other mechanical malfunction and which automatically resets for the next cycle of operation.

Further objects and advantages will appear from the following description and drawings wherein:

FIGURE 1 is a side elevation of a bolt making machine on which a pointer incorporating this invention is mounted;

FIGURE 2 is a side elevation partially in longitudinal section illustrating the structure of the reciprocating chuck and the gripping means for accurately locating the blank during the pointing operation;

FIGURE 2a is a side elevation partially in longitudinal section illustrating the upper adjustment structure of the clamping mechanism;

FIGURE 2b is a fragmentary perspective view of the rollers used to operate the grippers;

FIGURE 3 is a fragmentary perspective view of the linkage used to clamp the shank of the blank within the chuck with parts removed for purposes of illustration;

FIGURE 4 is an enlarged fragmentary view of the chuck drive mechanism illustrating the toggle linkage which prevents overloading due to jamming or the like;

FIGURE 6 is a cross-section of the pointer taken through the blank gripping station illustrating the feed mechanism for the pointer.

Figure 5:
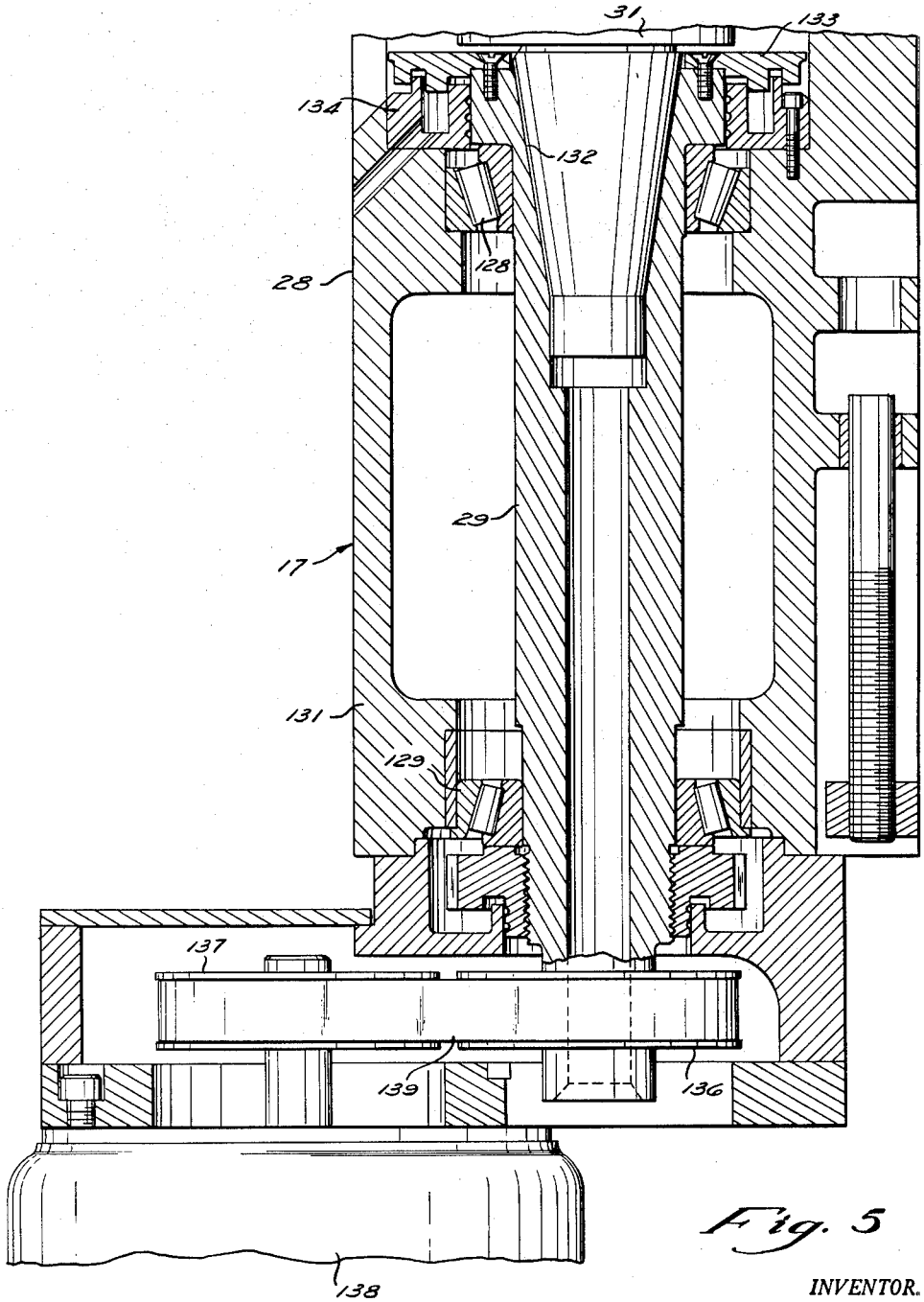
FIGURE 5 is a side elevation partially in longitudinal section of the cutter spindle and drive.

High quality bolts have rigid dimensional requirements which necessitate the use of a pointing operation to accurately form the length of the bolt shank. Those skilled in the art will recognize that when bolt blanks are formed by upsetting, even very slight variations in the mass of material contained within the blank will cause variations in the length of the blank. Therefore, this pointing apparatus serves to accurately cut the end of the shank to a predetermined length and form the chamfer as required for the thread rolling.

In FIGURE 1 a pointer incorporating this invention is shown installed for operation with a typical bolt making machine of the type which shears blanks from wire stock, upsets a head on a blank and accurately forms the shank diameter. The pointer cuts a properly dimensioned point on the headed blank after which a thread is rolled on the shank to produce a complete bolt within a single machine. During the operation of the machine for making bolts the sequence of blanks is maintained so that the period of time between each operation is uniform from one blank to the next thus insuring that the final bolts will be of uniform quality. In addition the maintenance of the uniform flow of blanks through the machine permits the adjustment of the various operating stages to compensate for wear in a manner which insures accurate bolt manufacture.

Because of the improved technology in heading machines the cyclic rate possible with such machines is greatly increased. The pointer assembly incorporating this invention is therefore arranged to operate at a high cyclic rate while still maintaining quality so that its operation speed is compatible with the speed of the header machine. To accomplish the increased speed it is necessary to provide accurate and positive gripping of the blank, optimum rates of feed during the pointing operation and accurate terminal positions so that the final blank will be uniformally dimensioned within the strict tolerance requirements of high quality bolts.

The assembled machine includes a frame 10 on which is mounted the usual header slide and dies to form the headed blank. A pointer mechanism shown generally at 11 is mounted on the frame 10 and is adapted to receive headed blanks through a feed tube 12. The blanks are automatically fed into the pointer from the feed tube and after the pointing operation is completed are transferred through a thread roller feed device 13 to a thread roller shown generally at 14. From the thread roller 14 the completed blanks are ejected from the machine and packaged for shipment. Although a pointer mechanism 11 incorporating this invention is shown for use in conjunction with a bolt making machine, it could be properly used in conjunction with any other compatible apparatus to point and shape any blank or article of a generally similar nature.

The pointer mechanism 11 includes two basic assemblies, the upper of which is a chuck assembly 16 and the lower of which is a cutter spindle and drive assembly 17. The chuck assembly is arranged to receive individual blanks accurately locating and tightly gripping the blanks and then carrying the blanks down against cutters within the cutter assembly thus forming an accurately dimensioned point on the end of the blank.

The chuck assembly is driven by a chuck drive linkage 18 powered by a cam 19 mounted on the frame 10 and connected to the header drive. Thus the operation of the chuck assembly 16 is timed with the operation of the basic heading machine so that the pointer has an output at least equal to the output of the header machine.

The chuck assembly structure is shown in detail in FIGURE 2. The pointer is provided with a frame 21 mounted on the frame 10 of the heading machine and a reciprocating chuck 22 mounted within the frame 21 for vertical reciprocation relative thereto. The chuck 22 is formed with guideways 23 which engage rollers 24 journaled on the frame 21. The rollers 24 on one side of the chuck 22 are mounted on eccentrics 26 which can be adjusted by means of set screws 27 to move the rollers 24 into a preloaded engagement with the guideways 23. This preloading of the rollers 24 insures that the chuck 22 is locked against any lateral play and eliminates clearances necessary in the usual slide type bearing guides. The complete elimination of lateral clearance enables high speed pointer operation since it eliminates one of the major causes of chattering during such cutting operations.

The cutter spindle and drive assembly 17 is also mounted on the frame 21 and includes a spindle frame 28 within which is journaled a rotating spindle 29. A cutter head 31 is mounted within the spindle 29 and is provided with a pair of cutters 32 and 33. The cutter 32 is formed with a laterally extending cutter face 34 proportioned to end cut a blank 36 and the cutter 33 is formed with a cutting face 37 proportioned to cut a conical chamber on the end of the blank 36. It should be understood that in some instances a greater or lesser number of cutters will be used depending on the particular shape of the point being formed. The two cutters 32 and 33 are rotated by an electric drive motor and are rigidly supported within the frame 28 as will be discussed in more detail below. However, it suffices to understand that the cutters rotate in a predetermined position and the blank 36 gripped within the chuck 22 is fed down against the cutters during the pointing operation.

In order to securely grip the blank 36 within the chuck 22, two separate gripping devices are utilized. The first operates to grip the head and axially position the blank relative to the chuck and the other operates to grip the shank and laterally position the blank relative to the chuck. The head gripping mechanism includes an insert 38 mounted in the chuck 22 by means of screw fasteners 39 and formed with a head receiving recess 41. The bottom wall of the recess 41 is formed by a laterally extending flange 42 against which the bottom of the head 43 of the blank 36 is positioned. The inner end of the flange 42 also provides a face against which the shank 44 of the blank 36 is clamped or gripped. A gripping or clamping rod 46 extends through a bore in the insert 38 and is proportioned to engage the upper side of the head 43 and firmly press the head against the flange 42 to axially locate the blank 36. The clamping rod 46 is formed with a head 47 against which a spring 48 acts to resiliently urge the clamping rod 46 upwardly to the unclamped position of FIGURE 2 while permitting the clamping rod 46 to move down into clamping engagement with the head 43 of the blank 36.

Lateral gripping of the blank 36 is provided by a laterally movable jaw element 49 best illustrated in FIGURE 3. The jaw element 49 is supported for lateral movement relative to the chuck 22 by an arm 51 pivoted on the chuck 22 at 52. The jaw element 49 is formed with a flange 53 laterally aligned with the flange 42 of the insert 38 and having an upper wall engaging the under side of the head 43 of the blank 36. The end face of the flange 53 is formed with a V-groove 54 best illustrated in FIGURE 3 which engages the shank 44 to laterally position the blank 36 by clamping the shank against the flange 42. In this manner positive control of the blank 36 and accurate positioning of the blank within the chuck 22 is achieved when the jaw element 49 is moved into engagement with the blank and the clamping rod 46 engages the head 43 of the blank. The jaw element 49 is provided with a projection 55 which intermeshes with a projection 56 on the insert 38 and cooperates therewith to form a bearing surface absorbing the axial load produced by engagement of the head portion 43 with the upper wall of the flange 53 when the clamping rod 46 is in the clamped or gripping position. This prevents the axial load from being applied to the pivot 52.

The operation of the clamping rod 46 is produced by the downward movement of the chuck 22 and a drive linkage operated by such movement. This linkage includes a push rod 50 axially aligned with the clamping rod 46 for vertical reciprocation relative to the chuck 22. A head 60 on the push rod 50 provides a shoulder against which a spring 57 operates to resiliently urge the push rod 50 toward the upward or retracted position. A cam arm 58 is pivoted on the chuck 22 for rotation about a pivot axis 59. A screw 61 is threaded into the cam arm 58 and is positioned to engage the upper face of the head 60 of the push rod 50 so that clockwise rotation of the cam arm 58 operates to push the push rod 50 downward and thereby move the clamping rod 46 into engagement with the upper side of the head 43 of the blank 36.

The cam arm 58 is formed with a cam face 62 engaging a roller 63 journaled on a cross shaft 64. The cross shaft 64 is mounted on a yoke 66 supported on a rod 67 which extends up through the frame 21 and a spring housing 68. A stop member 69 is clamped to the rod 67 by clamping screws 71 shown in FIGURE 2a and is provided with a shoulder 72 normally seated against a stop ring 73 welded into the spring housing 68.

A spring retainer 74 is threaded on the stop member 69 and provides a shoulder or flange 76 against which the upper end of a spring 77 is seated. The lower end of the spring 77 engages the frame 21 so that the spring 77 functions to urge the flange 72 into engagement with the stop ring 73 with a force which is a function of the position of the spring retainer 74 on the stop member 69. The force of the spring 77 can be increased by threading the spring retainer 74 down along the stop member 69 or decreased by threading it up along the stop member. This structure operates to resiliently maintain the roller 63 in an upper extreme position illustrated in FIGURE 2 but permits the roller to move downwardly against the action of the spring 77 when a predetermined force is exerted thereon.

To absorb the lateral reaction produced by engagement of the roller 63 with the cam arm 58, a U-shaped guide 78 is mounted on the chuck 22. This guide 78 which is shown in phantom in FIGURE 2b engages a pair of rollers 79 mounted on the cross shaft 64 on either side of the roller 63 as illustrated in FIGURE 2b.

The cam face 62 is shaped so that downward movement of the chuck 22 causes the cam face 62 to roll along the roller 63 and produce clockwise rotation of the cam arm 58 until the clamping rod 46 engages the upper face of the head 43 of the blank 36. When a predetermined clamping pressure is reached, a sufficient reaction is developed to overcome the action of the spring 77 and cause the roller 63 to move downwardly with the chuck 22. Thus, the spring 77 functions to insure that the correct clamping pressure is exerted by the clamping rod 46 on the head of the blank but prevents excessive pressure from being exerted by permitting the roller 63 to move with the chuck. Adjustment of the amount of clamping pressure is provided by adjusting the spring retainer 74 along the stop member 72. After the pointing operation is completed and the chuck returns to its upward position, the springs 48 and 57 operate to return the elements to the unclamped or ungripped position of FIGURE 2.

The operation of the jaw element 49 also results from chuck movement. In this case a cam arm 81 is pivoted on the chuck 22 for rotation about a pivot axis 82. An adjusting screw 83 is threaded into the lower end of the cam arm 81 and is arranged to engage the jaw element 49 when the cam arm is rotated in a clockwise direction. The upper end of the cam arm 81 is formed with a camming surface 84 which engages a roller 86 mounted on a cross shaft 87 in a yoke 88.

The structure of the yoke 88 and its support at its upper end is similar to that of the yoke 66. Therefore a rod 89 resiliently maintains the yoke 88 in the position of FIGURE 2, but permits its movement downward with the chuck 22 when a predetermined lateral clamping or gripping pressure is reached. Here again, a guide 91 absorbs the lateral force of engagement between the cam face 84 and the roller 86. The desired clamping force can be independently adjusted by adjusting a spring retainer 92 along the associated stop member in a manner similar to the adjustment of the head clamping force. A lock screw 93 is used to lock the spring retainer in position when the proper adjustment is achieved.

A spring 94 extends between the jaw element 49 and the cam arm 81 to resiliently urge the jaw element toward the clamp position. This spring provides a light clamping force which permits the insertion of the blank 36 into the position for pointing and lightly holds the blank within the V-groove 54 illustrated in FIGURE 3 until the positive clamping is produced by downward movement of the chuck 22.

By properly adjusting the stop member 69 along the rod 67 and the corresponding stop member along the rod 69, it is possible to vary the timing of the two clamping or gripping operations. Thus, the machine can be arranged so that the head is gripped before the shank, the head is gripped simultaneously with the gripping of the shank or the shank can be gripped first. In addition, adjustment of the spring retainers 74 and 92 permits the adjustment independently of the two distinct clamping or gripping forces. The various elements are proportioned so that the full degree of gripping or clamping is reached before the lower end of the blank 36 engages the cutters 32 and 33. Therefore the first portion of the downward travel of the chuck 22 operates to automatically clamp the blank 36 and the remaining portions of the downward travel feeds the blank to a predetermined position relative to the two cutters so that the blank is accurately pointed and cut to length.

The drive for reciprocating the chuck 22 is best illustrated in FIGURE 4 wherein the drive linkage 18 is shown in enlarged detail. The power to operate the drive linkage 18 is provided by the cam 19 which is connected to the main drive of the heading machine. A follower arm link 96 is pivoted on the frame of the machine for rotation about a pivot axis 97. A cam follower 98 is journaled on the end of the follower arm link 96 and positioned to engage the cam 19 causing oscillation of the link 96 under the influence of cam rotation. A separate drive link 99 is also journaled on the frame for rotation about the pivot axis 97 and is normally locked in a fixed orientation relative to the cam follower link 96 by a toggle linkage 101.

The toggle linkage includes a first link 102 pivoted at 103 on the follower arm link 96 and pivotally connected to a second link 104 at 106. The second link 104 is in turn connected by a pivot 107 to the drive link 99. The first and second toggle links 102 and 104 are provided with interengaging stop faces 108 and 109 respectively. These faces are proportioned to engage and limit relative rotation between the two links when the axis of the pivot 106 is slightly below a line connecting the axes of the pivots 103 and 107. Therefore, any compressive force tending to move the pivots 103 and 107 toward each other produces a component of force tending to fold the toggle from the aligned position shown but this component of force is substantially less than the originating compressive force.

In order to maintain the toggle in its normal substantially aligned position, a spring device is used which includes a tubular member 111 pivotally mounted on the frame 10 at 112 and a cooperating plunger 113 telescoping thereinto. A spring 114 extends between a shoulder 116 on the plunger 113 and an end member 117 to resiliently urge the plunger downwardly. The upper end of the plunger 113 is connected to a projection 118 on the second link 104 by a pivot 119. Thus, the spring 114 resiliently urges the second link 104 in a clockwise direction around its pivot 107, and resiliently maintaining the two stop faces 108 and 109 in engagement. In this condition the follower arm link 96 is locked relative to the drive link 99 so oscillation of the drive link 99 results from rotation of the cam 19.

The drive linkage 99 is connected through a push rod 121 to a rocker arm 122 pivotally mounted at 123 on the frame 21 of the pointer so that oscillation of the drive link in turn produces oscillation of the rocker arm. The end of the rocker arm 122 engages a roller 124 mounted on the chuck 22 so that clockwise rotation of the rocker arm 122 causes downward movement of the chuck 22 as viewed in FIGURE 2. A tension rod 126 shown in FIGURE 2 and FIGURE 2a is threaded into the upper end of the chuck 22 and is resiliently placed in tension by a spring similar to the spring 77 used to resiliently urge the rod 67 in an upward direction. Thus, the tension rod 126 through the action of its cooperating spring, resiliently urges the chuck 22 toward its upward extreme position in opposition to the action of the rocker arm 122. During the gripping and pointing operations, however, the chuck drive linkage 18 overcomes the tension force in the tension rod 126 and moves the chuck 22 down to a terminal position determined by the cam 19 and the adjustment of the linkage.

If excessive forces occur, due to jamming or the like, the toggle linkage 101 breaks or folds against the action of the spring 114 and permits rotation of the follower arm link 96 relative to the drive link 99 so that overload protection is provided. When the toggle folds, the tension rod 126 operates to immediately raise the chuck to its upper limit of movement thus preventing damage to the mechanism.

It should be noted that the spring 114 serves a triple function. It resiliently maintains the toggle linkage 101 in its normal operating position unless excessive forces are developed at which time it permits the toggle linkage to fold relieving the excessive load. The spring also serves to maintain the cam follower 98 in engagement with the cam 19 and in addition, resets the toggle linkage after it has folded if such automatic resetting is desired.

If automatic resetting is desired, an adjustable stop screw 127 threaded into the pointer frame 21 is adjusted so that it engages the rocker arm 122 when the rocker arm 122 reaches a position in counter-clockwise rotation around its pivot 123 substantially the same as the normal extreme of movement in this direction. Engagement of the stop by the rocker arm 122 therefore prevents clockwise rotation of the drive link 99 substantially beyond its normal extreme of movement and permits the spring 114 to reset the toggle linkage 101. If automatic resetting is not desired, the stop 127 is adjusted back to permit counter-clockwise rotation of the rocker arm 122 substantially beyond its normal extreme position, the drive link 99 then moves to a clockwise position substantially beyond its normal extreme position and the toggle linkage 101 cannot reset to its locked position. It should be noted that in normal operation, the spring 114 is compressed as the cam follower 98 moves toward high positions on the cam 19. Therefore, the force holding the toggle linkage 101 locked, increases as the chuck is moved down toward its terminal pointing position. This is desirable since jams or other malfunctions of the mechanism usually occur early in the stroke of the chuck and can trip the overload at a relatively low force level, but the drive is locked against overload release with a higher force during the actual pointing operation wherein rigidity and positive drive are essential.

The cutter spindle and drive assembly 17 is illustrated in detail in FIGURE 5. The rotating spindle 29 is journaled on spaced preloaded bearings 128 and 129 in a spindle drive housing 131. The spindle 29 is formed with a locking taper 132 in which the cutter head 31 is mounted. A disc 133 is bolted on to the spindle 29 below the cutters and cooperates with an annular insert 134 to prevent chips or coolant from entering the area of the bearing 128. A drive pulley 136 is mounted on the lower end of the spindle 29 and is connected to a pulley 137 on an electric motor 138 by a drive belt 139. Preferably, the drive belt 139 is of the toothed rubber type to provide positive driving action and to prevent chatter inducing vibrations from being transmitted to the spindle 29 from the motor 138.

A feed linkage best illustrated in FIGURE 6 is used to automatically feed successive blanks into the pointer. This linkage is driven by a cam 141 and an oscillating drive linkage 142 illustrated in FIGURE 1. This linkage operates to oscillate a rocker arm 143 which is connected to a blank pusher 144 illustrated in FIGURE 6. The blank pusher pushes blanks into the chuck 22 from a feed slide 146 in a manner timed with the operation of the pointer by virtue of the fact that both of the cams 141 and 19 are mounted on the same shaft. A gating element 147 is connected to the pusher 144 by a rocker arm 148 so that the gating element is retracted when the pusher moves forward and is moved forward when the pusher is retracted. This mechanism, which is similar to the feed illustrated and discussed in the patent cited above, operates to feed or insert a blank into the chuck 22 each time the pointer operates and by virtue of engagement between the inserted blank with the prior blank eject the pointed blank from the chuck into the thread roller feed system 13.

A high degree of reliability and high speed operation is achieved by a pointer incorporating this invention since the blank is independently gripped or clamped in two directions. The head is gripped to provide proper axial positioning of the blank and the shank is gripped to provide proper lateral positioning of the blank. Because the blank is positively gripped within the chuck and because the chuck is supported on preloaded bearings, any tendency to chatter is substantially eliminated even though the cutting of the blank operates at a high speed. This non-chatter feature permits the use of high speed cutters of the tungsten-carbide type which would chip or break if chatter were permitted. Such cutters, of course, permit higher operating speeds. In addition the gripping to the desired pressure level is automatically controlled by the tension of the springs associated with the rollers 63 and 86. It is a simple matter to separately adjust the timing and the pressure of the two gripping means by adjusting the associated stops and springs.

The positive mechanical feed of the chuck which carries the blank down against the cutters is programmed by the cam 19 for optimum cutting and uniform shank length. The pointing apparatus, however, is not damaged if a malfunction occurs since overload mechanisms are provided. When desired, the mechanism can be adjusted to automatically reset the overload toggle or if desired, the drive can be adjusted so that the machine remains in the inoperative condition until manually reset in the event the overload toggle is folded.

The mounting of the cutter spindle on spaced preloaded bearings driven by a belt drive also permits the increased speed of operation by reducing vibration which can induce chattering since the spindle support is rigid and the belt serves as a vibration damper. The cooperation of all of the features of this invention permits increased operational speeds so that the pointer can be operated at the high cyclic rate now possible with improved heading devices.

Although a preferred embodiment of this invention is illustrated, it will be realized that various modifications of the structural details may be made without departing from the mode of operation and the essence of the invention. Therefore, except insofar as they are claimed in the appended claims, structural details may be varied widely without modifying the mode of operation. Accordingly, the appended claims and not the aforesaid detailed description are determinative of the scope of the invention.

What is claimed is:

1. In a bolt making machine including a header operable to form blanks having a head and a shank and a thread roller operable to roll threads on the shank the combination therewith of a pointer comprising a pointer frame, a rotating cutter on said frame, a chuck reciprocable in said frame between a retracted position and a terminal position closer to said cutter than said retracted position, first and second grippers on said chuck operable to grip the head and shank of a blank respectively, a linkage associated with each gripper, each linkage including a member resiliently urged toward a predetermined position relative to said frame and a cam mounted on said chuck engaging said member and connected to operate the associated gripper in response to relative movement between said member and cam when said chuck moves from said retracted position, said members moving with said cams and chuck when the force of said cams thereon exceeds predetermined limits, a feed operable to receive blanks from said header and insert one into said grippers each time said chuck moves to said retracted position and simultaneously eject a previously inserted blank therefrom for transfer to said thread roller, and a drive operating in timed relationship to said header connected to move said chuck to said terminal position.

2. An automatic metal cutting machine comprising a spindle journaled in preloaded taper bearings, spindle drive power means, a rubber like belt connecting said power means to rotate said spindle, a cutter mounted on said spindle, a chuck, preloaded opposed roller bearings guiding said chuck for reciprocating movement toward and away from said cutter, blank gripping means automatically locking a blank in a predetermined position relative to said chuck whereby the blank is shaped by said cutters when said chuck is moved toward said cutters, feed means operating in timed relationship to chuck reciprocation operating to eject a shaped blank and insert a blank to be shaped each time said chuck reciprocates, and a cam drive connected to move said chuck toward said spindle, said cam drive means including an automatic overload release means operable to permit said chuck to move away from said cutter when the force required to move said chuck toward said cutter exceeds predetermined limits, and an adjustable stop engaging said cam drive means operable when adjusted to one position to hold said overload release means in a position in which it remains released and when adjusted to a second position to hold said overload release means in a position in which it automatically resets for continued operation.

3. In a bolt making machine including a header operable to form blanks having a head and a shank and a thread roller operable to roll threads on the shank the combination therewith of a pointer comprising a pointer frame, a rotating cutter on said frame, a chuck reciprocable in said frame between a retracted position and a terminal position closer to said cutter than said retracted position, first and second grippers on said chuck operable to grip the head and shank of a blank respectively, a linkage associated with each gripper, each linkage including a member resiliently urged toward a predetermined position relative to said frame and a cam mounted on said chuck engaging said member and connected to operate the associated gripper in response to relative movement between said member and cam when said chuck moves from retracted position, said members moving with said cams and chuck when the force of said cams thereon exceeds predetermined limits.

4. A pointer for blanks comprising a frame, rotating cutters journaled on said frame, a chuck reciprocable on said frame toward and away from said cutters operable to grip blanks and carry them into cutting engagement with said cutters, first resilient means urging said chuck in a direction away from said cutters, a rotating cam, a pair of links pivoted for rotation about an axis, one of said links being operatively connected for oscillation by said cam, the other of said links being operatively connected to reciprocate said chuck upon oscillation thereof, a pair of toggle elements pivotally connected together and piovtally connected one to each link, a second spring means connected to one of said elements urging said elements toward a locked position wherein the pivots thereof are substantially aligned with a force which increases as the links move said chuck toward said cutters, said elements normally preventing relative rotation between said links when in said aligned position and folding therefrom when the forces resisting chuck movement toward said cutters exceeds predetermined limits.

5. A pointer for bolt blanks comprising a frame, rotating cutters journaled on said frame, a chuck reciprocable on said frame toward and away from said cutters operable to grip blanks and carry them into cutting engagement with said cutters, first resilient means urging said chuck in a direction away from said cutters, a rotating cam, a pair of links pivoted for rotation about an axis, one of said links being operatively connected for oscillation by said cam, the other of said links being operatively connetced to reciprocate said chuck upon oscillation thereof, a pair of toggle elements pivotally connected together and pivotally connected one to each link, a second spring means connected to one of said elements urging said elements toward a locked position wherein the pivots thereof are substantially aligned with a force which increases as the links move said chuck toward said cutters, said elements normally preventing relative rotation between said links when in said aligned postion and folding therefrom when the forces resisting chuck movement toward said cuters exceeds predetermined limits, and adjustable stop means limiting the movement of said chuck in a direction away from said cutters when in one adjusted position preventing said toggle elements from returning to their locked position and when in another adjusted position allowing said toggle elements to automatically return to their locked position under the influence of said second spring means.

6. In a bolt making machine including a header operable to form blanks having a head and a shank and a thread roller operable to roll threads on the shank the combination therewith of a pointer comprising a rotating cutter, a pointer frame, a chuck reciprocable in said frame on preloaded bearings between a retracted position and a terminal position closer to said cutter than said retracted position, first and second grippers on said chuck operable to grip the head and shank of a blank respectively, a linkage associated with each gripper, each linkage including a member resiliently urged toward a predetermined position relative to said frame and a cam mounted on said chuck engaging said member and connected to operate the associated gripper in response to relative movement between said member and cam when said chuck moves from said retracted position, said members moving with said cams and chuck when the force of said cams thereon exceeds predetermined limits, a feed operable to receive blanks from said header and insert one into said grippers each time said chuck moves to said retracted position and simultaneously eject a previously inserted blank therefrom for transfer to said thread roller, and a drive operating in timed relationship to said header connected to move said chuck to said terminal position with a force no greater than second predetermined limits.

7. A pointer for bolts having a head and a shank comprising a frame, a chuck reciprocable on said frame, a rotating cutter on said frame, a head jaw mounted on said chuck operable to grip and axially located said head relative to said chuck, a shank jaw mounted on said chuck operable to grip and locate said shank relative to said chuck, a first drive means operated by chuck movement and connected to operate said head jaw to grip said head with a predetermined pressure, a second drive means operated by chuck movement and connected to operate said shank jaw to grip said shank with a predetermined pressure, a chuck drive means connected to move said chuck in one direction to a terminal position wherein said bolt engages said cutter and is pointed thereby, resilient means connected to urge said chuck in a direction opposite said one direction, said chuck drive means including overload release means operable to release said chuck drive means at a load level which increases as said chuck moves in said one direction toward said terminal position.

8. A pointer for blanks having a head and a shank comprising a frame, a rotating cutter on said frame, a chuck reciprocable on said frame toward and away from said cutter, first grippers on said chuck operable to grip and laterally locate the shank of a blank with respect to said chuck, second grippers on said chuck operable to grip and axially locate the head of a blank relative to said chuck, first drive means connected to said first grippers and operable in response to relative movement between said chuck and frame to clamp said first grippers, and second drive means connected to said second grippers and operable in response to relative movement between said chuck and frame to clamp said second grippers.

9. A pointer for blanks having a head and a shank comprising a frame, a rotating cutter on said frame, a chuck reciprocable on said frame toward and away from said cutter, first grippers on said chuck operable to grip and laterally locate the shank of a blank with respect to said chuck, second grippers on said chuck operable to grip and axially locate the head of a blank relative to said chuck, first drive means connected to said first grippers and operable in response to relative movement between said chuck and frame to clamp said first grippers, and second drive means connected to said second grippers and operable in response to relative movement between said chuck and frame to clamp said second grippers, each of said first and second drive means including means to limit the gripping force of the associated grippers.

10. A pointer for blanks having a head and a shank comprising a frame, a rotating cutter on said frame, a chuck reciprocable in said frame between a retracted position and a terminal position closer to said cutter than said retracted position, first and second grippers on said chuck operable to grip the head and shank of a blank respectively, a linkage associated with each gripper, each linkage including a member resiliently urged toward a predetermined position relative to said frame and a cam mounted on said chuck engaging said member and connected to operate the associated gripper in response to relative movement to said member and cam when said chuck moves from said retracted position, said members moving with said cams and chuck when the force of said cams thereon exceeds predetermined limits.

References Cited in the file of this patent

UNITED STATES PATENTS

| | | |
|---|---|---|
| 585,762 | Jacobs | July 6, 1897 |
| 905,600 | Sonneborn | Dec. 1, 1908 |
| 1,300,240 | Blakeslee | Apr. 15, 1919 |
| 1,975,537 | Criley | Oct. 2, 1934 |
| 2,020,660 | Friedman | Nov. 12, 1935 |
| 2,783,687 | Roberts | Mar. 5, 1957 |
| 2,811,876 | Batchelder | Nov. 5, 1957 |
| 2,918,333 | Friedman | Dec. 22, 1959 |
| 3,056,981 | Byam | Oct. 9, 1962 |

FOREIGN PATENTS

| | | |
|---|---|---|
| 842,282 | Great Britain | July 27, 1960 |